July 14, 1942.          D. M. LIGHT                2,289,790
                          SNUBBER
                    Filed March 14, 1940            2 Sheets-Sheet 1
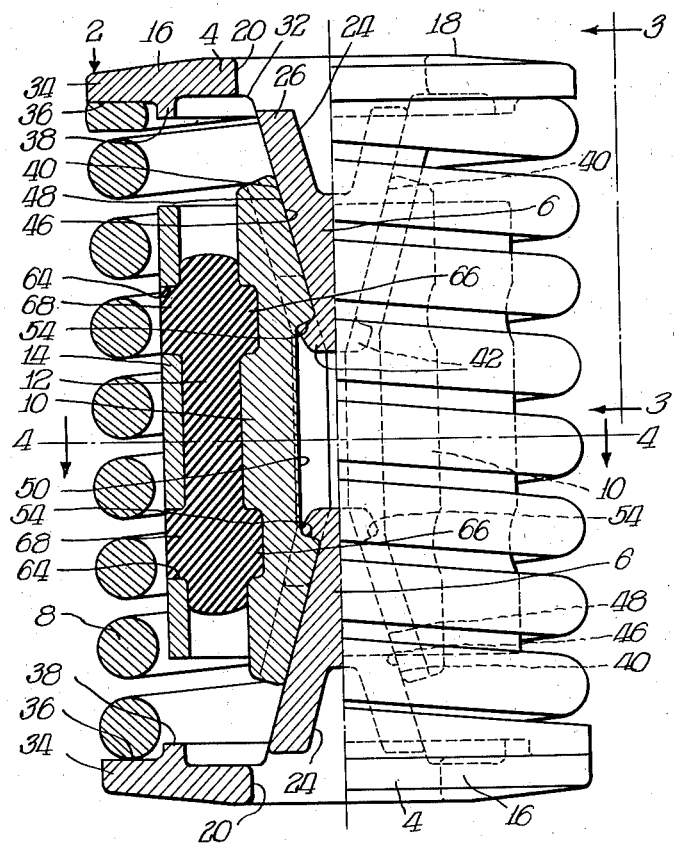
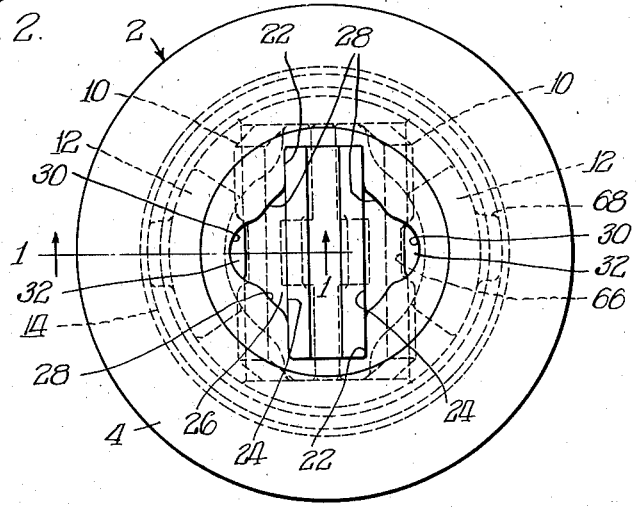
INVENTOR.
David M Light,
BY
ATTORNEY.

July 14, 1942.　　　D. M. LIGHT　　　2,289,790
SNUBBER
Filed March 14, 1940　　　2 Sheets-Sheet 2
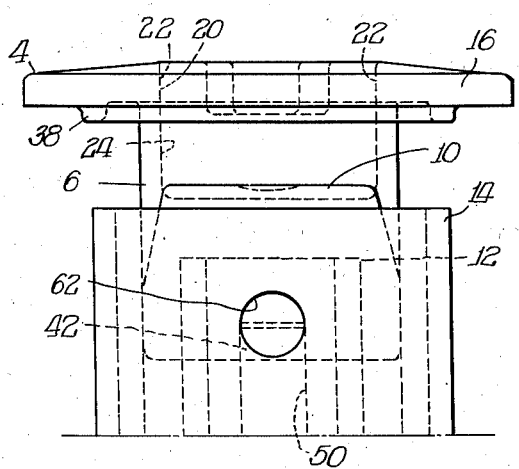
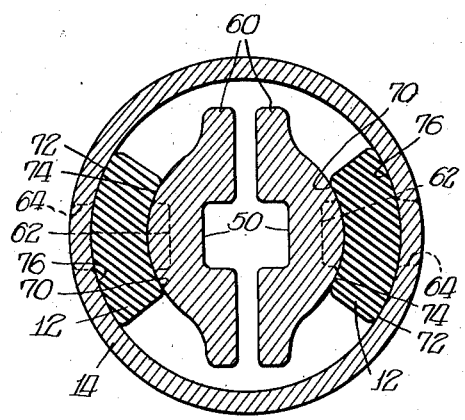
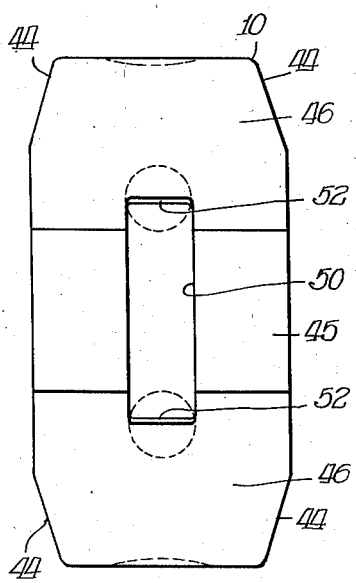
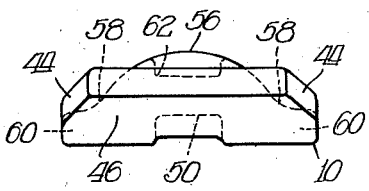
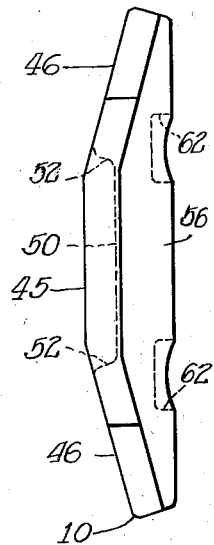
INVENTOR.
David M Light
BY
ATTY.

Patented July 14, 1942

2,289,790

UNITED STATES PATENT OFFICE 2,289,790

SNUBBER

David M. Light, Chicago, Ill., assignor to American Steel Foundries, Chicago, Ill., a corporation of New Jersey Application March 14, 1940, Serial No. 323,958

24 Claims. (Cl. 267—9)

My invention relates to friction absorbing devices and more particularly to a device in which friction means are operable within a coil spring and serves to eliminate undesirable harmonic vibrations in an associated spring group.

An object of my invention is to design a friction absorbing device having friction means cooperating with a coil spring and suitable for replacement of a single coil spring in a standard spring arrangement.

My invention contemplates an arrangement of a snubbing device wherein a coil spring may be seated between identical end followers having wedge portions extending within a cylinder spaced from said end followers and enclosed within said spring with friction shoes engaging said wedges, and resilient members compressed between said shoes and said cylinder.

A different object of my invention is to design such an arrangement wherein interlocking means are provided on said followers and said shoes to maintain said device in assembled relationship.

A further object of my invention is to design such a snubbing device in which means on the followers maintain the friction shoes in their proper arrangement during operation.

Referring to the drawings, Figure 1 is a side elevation of my novel invention, half in section, said section being taken substantially in the vertical plane indicated by line 1—1 of Figure 2.

Figure 2 is a top plan view of the device shown in Figure 1.

Figure 3 is a fragmentary side view of the device shown in Figure 1 with the coil spring removed, said view being taken substantially from the right thereof as viewed from the plane indicated by line 3—3 of Figure 1.

Figure 4 is a sectional view of the device shown in Figure 1, said section being taken substantially in the horizontal plane indicated by line 4—4 of Figure 1, with the coil spring omitted.

Figure 5 is a side view showing the inner face of one of the novel friction shoes used in my device. Figure 5A is a top plan view of the shoe shown in Figure 5, and Figure 5B is an edge view of the shoe shown in Figure 5.

Describing my novel invention in detail, the snubbing device generally indicated at 2 comprises end followers 4, 4 having wedge portions 6, 6 integrally formed therewith and extending within a coil spring 8, friction shoes 10, 10 engaging said wedge portions, and resilient pads 12, 12 compressed between said shoes and a cylinder 14 supported thereby within said spring.

The form of each end follower 4 may be identical and includes a circular base 16 having a generally arcuate outer face 18 affording convenient seating means for said device. Centrally interrupting said outer face may be a recess 20 having opposite rectangular portions 22, 22 (Figure 2) in alignment with the rectangularly shaped opening 24 formed in the base portion 26 of said wedge 6. Intermediate said rectangular portions 22, 22, the recess 20 may be widened radially outwardly as indicated at 28 and 30. Apertures 32, 32 may be formed at the juncture of the base 16 and the wedge 6 (Figure 1) to afford drainage means. An annular flange 34 formed on the outer circumference of said base affords convenient seating means for said spring as at 36, and an annular rib 38 formed on the inner surface of said base 16 serves as positioning means therefor.

Each wedge 6 has a substantially rectangular profile as viewed in Figure 3 and inwardly tapering converging wedge faces 40, 40 as viewed from Figure 1. A central lug 42 may be formed at the extremity of each face 40 serving a purpose hereinafter described.

The form of the friction shoes 10, 10 may be best considered from Figures 5, 5A, and 5B wherein it may be noted that each shoe is of substantially rectangular shape with chamfered ends as at 44, 44 and on opposite ends of its inner face 45 has tapering friction surfaces 46, 46 complementary to and engaging said wedge faces 40, 40 on the opposed end followers 4, 4 as at 48 (Figure 1). Extending between said faces may be a slot or groove 50 which receives the lugs 42, 42 on said wedges for sliding engagement therewith, thus serving to retain said shoes in proper arrangement during operation. When the device is not under load, said lugs abut the end walls 52, 52 of said slots as at 54 (Figure 1) and thus afford means for maintaining said device in assembled relationship. The outer arcuate face 56 of said shoes may be formed concentric with the cylinder 14, and the arc of said face may smoothly merge as at 58 with the flanges 60, 60 formed along opposite longitudinal edges of said shoes, thus affording smooth surfaces along which said resilient pads 12 may flow without abrasion in operation.

Spaced aligned recesses 62, 62 and 64, 64 provided respectively in the outer arcuate face 56 of said shoes and in the cylinder 14 receive the spaced lugs 66, 66 and 68, 68 formed on said resilient pads. Said pads may be of any suitable resilient material, such as rubber composition, and as best seen in Figure 4 may be formed with their inner and outer faces 70 and 72 concentric with said cylinder, said inner face 70 having abutment against said outer arcuate face 56 of said shoes as at 74 and said outer face 72 having abutment against inner circumferential areas of said cylinder as at 76. The cylinder may be spaced from said end followers 4, 4 within said spring and may be supported therein by said resilient pads 12, 12.

When load is applied, the end followers move inwardly urging said shoes outwardly and said resilient pads are further compressed between said shoes and said cylinder. When the load is released, the parts return to their normal positions.

Applicant recognizes that the aforedescribed device is operative whether or not the coil spring 8 is used. It is contemplated that in an arrangement of said device without the coil spring, the angles of engagement of the shoes 10, 10 and the wedges 6, 6 may be modified as desired, the cylinder encircling said shoes may be of greater diameter, and the resilient pads may be enlarged to afford suitable resilient capacity. It is apparent that in such an arrangement the enlarged resilient pads operate to increase the frictional absorption of said device when under load and to return the parts of said device to their normal positions when the load is released.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a friction device, a compression spring, end followers with annular flanges affording seats for said spring, friction means enclosed within said spring and comprising wedge members on said followers, friction shoes extending between said wedge members and having wedge face engagement therewith, a cylindrical member encircling said shoes and spaced from said followers, resilient pads positioned between said cylindrical member and said shoes and having arcuate face engagement therewith, and lugs on said wedges slidingly engaging slots on said shoes to retain said device in assembly.

2. In a friction device, a coil spring, end followers having annular flanges affording seats for opposite ends of said spring, friction means operable within said spring and comprising a floating cylinder supported between said followers, wedges on said followers extending within said cylinder, friction shoes engaging said wedges, arcuate resilient pads abutting said shoes and said cylinder, lugs on said pads accommodated within means on said cylinder and shoes for supporting said cylinder, and interengaging means on said wedges and said shoes retaining said device in assembled relationship.

3. In a friction absorbing device, a coil spring, end followers having annular flanges affording seats therefor, and friction means operable within said spring, said friction means comprising a cylinder spaced from said end followers within said spring, wedge means on said followers extending within opposite ends of said cylinder, friction shoes having complementary surfaces engaging said wedge means, and resilient means compressed between said cylinder and said shoes and having spaced lugs in engagement with means on said shoes and said cylinder affording support for said cylinder.

4. In a friction absorbing device, end followers, a compression spring seated therebetween, friction means enclosed within said spring and comprising wedge means on said followers, friction shoes engaging complementary faces on said wedge means, a floating cylinder encircling said shoes, pads of resilient material compressed between said shoes and said cylinder and having arcuate face engagement therewith, and spaced positioning means on said pads engaging complementary recesses on said shoes and said cylinder respectively.

5. In a friction absorbing device, a compression spring, end followers having annular flanges affording seats therefor, friction means operable within said spring and comprising wedges on said followers projecting within said spring, friction shoes engaging said wedges and presenting outer arcuate faces, a floating cylinder encircling said shoes, resilient means abutting said arcuate faces and adjacent portions of said cylinder, and spaced lugs on said resilient means interlocked with means on said shoes and said cylinder to afford supporting means for said cylinder.

6. In a friction absorbing device, a compression spring, end followers with annular flanges affording seats therefor, friction means operable within said spring and comprising wedges on said followers projecting within said spring, friction shoes engaging said wedges, a floating cylinder between said followers encircling said shoes, resilient means having arcuate face engagement with said shoes and adjacent portions of said cylinder and having lugs interlocked with said shoes and said cylinder, and retaining lugs on said wedges abutting shoulders on said shoes.

7. In a friction absorbing device, a compression spring, end followers with annular flanges affording seats therefor, wedges on said followers projecting within said spring, shoes having complementary faces frictionally engaging said wedges, a member spaced from said followers and encircling said shoes, resilient means compressed between said member and said shoes, and having arcuate face engagement therewith, and interlocking means on said resilient means and on said member affording support for said member.

8. In a friction absorbing device, end followers, a compression spring seated therebetween, friction means enclosed within said spring and comprising wedge means on said followers, friction shoes engaging complementary faces on said wedge means, a floating cylinder encircling said shoes, pads of resilient material in the form of segments of a cylinder compressed between said shoes and said cylinder, and spaced means positioning and interlocking said pads between said shoes and said cylinder.

9. In a friction absorbing device, a coil spring, end followers affording seats therefor, friction means operable within said spring and comprising a cylinder spaced from said followers, wedges on said followers extending within said cylinder, friction shoes engaging said wedges and presenting arcuate outer faces, resilient pads compressed between said arcuate faces and said cylinder, and projecting members on said pads accommodated in recesses on said shoes and cylinder for positioning said pads.

10. In a friction absorbing device, a coil spring, end followers affording seats therefor, friction means operable within said spring and comprising a floating hollow member spaced from said followers, wedges on said followers extending within said member, friction shoes extending between said wedges for engagement therewith, and resilient means abutting said member and said shoes and having oppositely projecting members interlocked therewith for supporting said member.

11. In a friction absorbing device, end followers, a compression spring seated therebetween, friction means enclosed within said spring and comprising wedge means on said followers, friction shoes with complementary faces engaging said wedge means, a cylindrical member spaced from said spring and surrounding said shoes, and resilient means interlocked between said shoes and said member and having arcuate face engagement therewith.

12. In a friction absorbing device, a cylinder, end followers spaced therefrom and having wedge means projecting therewithin, friction shoes engaging opposite sides of said wedge means, resilient pads in the form of segments of a cylinder interposed between each of said shoes and the adjacent walls of said cylinder, spaced interengaging means on said pads and said shoes and said cylinder for positioning said pads and interlocking members on said wedge means and said shoes to retain said device in assembled relationship.

13. In a friction absorbing device, a coil spring, end followers with annular flanges affording seats therefor, friction means operable within said spring and comprising a cylinder spaced from said followers, wedges on said followers extending within said cylinder, friction shoes engaging said wedges and presenting arcuate outer faces, and resilient pads abutting said arcuate faces and said cylinder.

14. In a friction absorbing device, a floating cylinder, end followers presenting wedge members extending within opposite ends of said cylinder, friction shoes engaging opposite sides of said wedge means, resilient pads abutting said shoes and adjacent walls of said cylinder, and spaced members on said pads interlocked with said cylinder and said shoes respectively for supporting said cylinder.

15. In a friction absorbing device, end followers, outer resilient means seated therebetween, a floating cylinder within said outer resilient means, wedges on said followers extending within opposite ends of said cylinder, shoes frictionally engaging said wedges, and a plurality of inner resilient means abutting said shoes and said cylinder and having spaced positioning members interlocked therewith.

16. In a friction absorbing device, end followers, a compression spring seated therebetween, friction means enclosed within said spring and comprising wedge means on said followers, friction shoes with complementary faces engaging said wedge means, a member spaced from and surrounding said shoes, and resilient means interposed between said shoes and said member and having arcuate face engagement therewith.

17. In a friction absorbing device, a coil spring, end followers having wedge means projecting therewithin, friction shoes engaging said wedge means along complementary faces, a cylinder floating between said followers and encircling said shoes, and pads of resilient material in concentric relationship with said cylinder compressed between said cylinder and said shoes and having spaced members interlocked therewith for positioning said pads.

18. In a friction absorbing device, a cylinder, end followers spaced therefrom and having wedges extending within opposite ends thereof, friction shoes engaging said wedge means at opposite sides of said device, resilient members in the form of segments of a cylinder abutting said friction shoes and said cylinder, and interengaging means on said members and said shoes and cylinder for supporting said cylinder.

19. In a friction absorbing device, a floating cylinder, end followers spaced therefrom and having wedge means projecting therewithin, friction shoes engaging opposite sides of said wedge means, and resilient pads in abutment with and interlocked with said shoes and the adjacent walls of said cylinder for supporting said cylinder in a substantially central position between said followers.

20. In a friction absorbing device, a floating cylinder, end followers presenting wedge members within opposite ends of said cylinder, friction shoes engaging opposite sides of said wedge means, and resilient pads under compression having arcuate face engagement with said shoes and adjacent walls of said cylinder.

21. In a friction device, outer resilient means, end followers seated on opposite ends thereof and presenting wedge means, friction shoes engaging said wedge means, arcuate outer faces on said shoes, a cylinder substantially enclosing said shoes, and resilient pads between said shoes and said cylinder having abutment with said outer faces and adjacent portions of said cylinder, and spaced means on said pads interlocked with said shoes and said cylinder for supporting said cylinder.

22. In a friction absorbing device, end followers each presenting a wedge extending toward the other, shoes extending between said wedges for frictional engagement therewith, a cylinder enclosing said shoes and said wedges, resilient means under compression between said shoes and said cylinder and in concentric relationship with said cylinder, and means on said resilient means interlocked with said cylinder and with said shoes respectively for supporting said cylinder between said followers.

23. In a friction absorbing device, end followers each presenting a wedge extending toward the other, shoes extending between said wedges for frictional engagement therewith, a hollow member enclosing said shoes and said wedges, resilient pads abutting said shoes and said member, and spaced lugs on said pads engaging means on said hollow member and on said shoes respectively for supporting said member.

24. In a friction absorbing device, end followers each presenting a wedge extending toward the other, shoes extending between said wedges for frictional engagement therewith, a hollow member enclosing said shoes and said wedges, resilient pads in complementary arcuate engagement with said shoes and said member, and spaced lugs on said pads engaging means on said hollow member and on said shoes respectively for supporting said member.

DAVID M. LIGHT.